US008190467B2

(12) United States Patent
Letendre-Hedlund

(10) Patent No.: US 8,190,467 B2
(45) Date of Patent: May 29, 2012

(54) METHODS OF IDENTIFYING ENVIRONMENTALLY FRIENDLY BUSINESSES OR INDIVIDUALS

(76) Inventor: Michelle Letendre-Hedlund, Mound, MN (US)

( * ) Notice: Subject to any disclaimer, the term of this patent is extended or adjusted under 35 U.S.C. 154(b) by 390 days.

(21) Appl. No.: 12/254,721

(22) Filed: Oct. 20, 2008

(65) Prior Publication Data
US 2009/0106317 A1    Apr. 23, 2009

Related U.S. Application Data

(60) Provisional application No. 60/999,785, filed on Oct. 19, 2007, provisional application No. 61/007,655, filed on Dec. 14, 2007.

(51) Int. Cl.
*G06Q 10/00* (2012.01)
*G06Q 30/00* (2012.01)
*G06Q 99/00* (2006.01)

(52) U.S. Cl. ............... 705/7.29; 705/7.32; 705/7.39; 705/317

(58) Field of Classification Search ............ None
See application file for complete search history.

(56) References Cited

U.S. PATENT DOCUMENTS

| | | | | |
|---|---|---|---|---|
| 6,490,565 | B1 * | 12/2002 | Beldock | 705/7.38 |
| 7,197,397 | B2 | 3/2007 | Matsuda et al. | |
| 2003/0018487 | A1 * | 1/2003 | Young et al. | 705/1 |
| 2004/0093098 | A1 | 5/2004 | Ohki et al. | |
| 2004/0143467 | A1 * | 7/2004 | McAllister et al. | 705/7 |
| 2005/0021389 | A1 * | 1/2005 | Dias et al. | 705/10 |
| 2005/0137921 | A1 * | 6/2005 | Shahriari | 705/7 |
| 2005/0209905 | A2 * | 9/2005 | Ness et al. | 705/10 |
| 2006/0100897 | A1 * | 5/2006 | Halloran et al. | 705/1 |
| 2006/0106635 | A1 * | 5/2006 | Ulrich et al. | 705/1 |
| 2006/0129450 | A1 * | 6/2006 | Zarrow | 705/11 |
| 2006/0265230 | A1 * | 11/2006 | Shiga | 705/1 |
| 2006/0282296 | A1 * | 12/2006 | Avey et al. | 705/4 |
| 2007/0265921 | A1 * | 11/2007 | Rempe et al. | 705/14 |
| 2009/0171992 | A1 * | 7/2009 | Roberts | 707/100 |

FOREIGN PATENT DOCUMENTS

EP    1 288 813 A1    3/2003

OTHER PUBLICATIONS

Wu et al. "Environmentally responsible logistics system" (1995) International Journal of Physical and Distribution & Logisitcs, vol. 25 No. 2, pp. 20-38.*
www.envirostars.org, as evidenced by the website on Aug. 13, 2006 (retrieved by the Internet Archive Wayback Machine on Sep. 1, 2011).*
PCT Search Report, May 29, 2009.
Carbon Disclosure Project (https://www.cdproject.net/en-US/Pages/HomePage.aspx) © 2009.
Green Snapshot (http://greensnapshot.homestead.com) © 2008.
Climate Counts references (http://www.climatecounts.org) © 2006-2011.

* cited by examiner

*Primary Examiner* — Romain Jeanty
*Assistant Examiner* — Sujay Koneru
(74) *Attorney, Agent, or Firm* — Brett Klein; Dan Bruzzone; Grace Kim

(57) ABSTRACT

This disclosure relates to techniques for a computer-implemented method which receives user input that specifies values for predetermined questions provided in an environmental questionnaire, identifies environmentally friendly businesses or individuals by analyzing the user input values and determining those businesses or individuals that meet predetermined minimum requirements, and stores a list of the identified businesses or individuals within a database.

20 Claims, 17 Drawing Sheets

UPONGREEN®
making 'green' consumer & business-friendly

ABOUT UP   INDIVIDUALS JOIN UP   BUSINESSES JOIN UP   ORDER UP   UP IN THE NEWS   CONTACT UP   ORGS

[login]

Email a UP'vites to business, family and friends encouraging them to get UP ON GREEN!

UP'vite search to see if your favorite business is UPonGREEN

[search]

please spell business name correctly partners

UP partners can provide information & services to help you become more UP ON GREEN! Click on the desired link to learn more Recycling...
Compact fluor...

◀ Home >> Businesses Join Up >> Complete a Criteria/Eco-Profile

● Eco-Profile part 1 (required)    ● sign up    ● Eco-Profile part 2 (optional)    ● decals    ● checkout ECO-NOMICS
Click here before completing your criteria to see examples of how these easy actions can *help protect the earth and your bottom line*.

BUSINESS CRITERIA APPLICATION

NOTE: You are required to do 9 out of 14 of the items listed below to be an UP ON GREEN member.

YES NO   OUR COMPANY
○Yes ○No   OUR COMPANY uses high-efficiency lighting approved by Energy Star such as T8s T5s LEDs, CFLs (>75%).
Please identify what lights your company is using

*Fig. 3B*

○Yes ○No    OUR COMPANY recycles paper, plastic, glass, aluminum, batteries, electronics and fluorescent lights throughout the company. We also provide recycling containers in customer areas.
Please name the recycling company that you hire for pickup.
[_____]

○Yes ○No    OUR COMPANY uses post-consumer recycled paper throughout all office printers, fax machines & copiers. What is the percentage of post-consumer content in your office paper?
[____]%

○Yes ○No    OUR COMPANY manages its temperature with a high-efficiency programmable thermostat and we adjust it to 68 degrees in the winter and 80 degrees in the summer and reduce it to the greatest energy efficient setting possible during non-labor hours.

○Yes ○No    OUR COMPANY offers incentives for employees to use public transit, carpool, hybrid vehicles or non-motorized transportation. Please note any incentives your company offers to employees using alternative transportation means. [_____] What percentage of your employees are taking advantage of these incentives? [____]%

○Yes ○No    OUR COMPANY hibernates the monitors on its computers after 5 minutes without use and shuts the computers down completely during non-work hours. (Additionally we keep brightness levels on our screens down to a level that is safe & comfortable for our employee's eyes, yet at levels that conserve energy.)

○Yes ○No    OUR COMPANY has removed its name and continues to keep the company off junk mail and catalog lists, which are unnecessary and go unread. (Assign one person in your organization to manage this and to verify the catalog or junk mail company has indeed removed your company's name.)

Fig. 3C

○Yes ○No    OUR COMPANY has installed low-flow and high-pressure plumbing fixtures and maintains the plumbing to prevent leaks, drips and water waste.

○Yes ○No    OUR COMPANY offers drinking water for employees and guests of our company that isn't packaged or shipped in plastic.

○Yes ○No    OUR COMPANY buys locally whenever possible (within a 100 mile radius).

○Yes ○No    OUR COMPANY offers and/or buys organic, natural, sustainable, and/or renewable products (> 20%).

○Yes ○No    OUR COMPANY encourages its employees and its suppliers to become UP ON GREEN members.

○Yes ○No    OUR COMPANY has received an energy audit within the past 12 months to help ensure maximum efficiency in its energy usage. Please list the organization that performed the energy audit for your company and the month/year of the audit.

○Yes ○No    OUR COMPANY donates and/or volunteers for social and/or environmental betterment organizations.

Please list organizations that your company supports [____]

Please note whether your company donates and/or volunteers

○ donates   ○ volunteers   ○ donates & volunteers

Fig. 3D

OUR COMPANY USES & PROMOTES THE FOLLOWING CERTIFICATIONS

- ☐ Energy Star Products & Appliances
- ☐ Environmentally Preferable Products Database
- ☐ Forest Stewardship Council
- ☐ Greenguard
- ☐ Greenseal
- ☐ Greenmark
- ☐ Leadership in Energy and Environmental Design (LEED)
- ☐ Scientific Certification Systems
- ☐ Certified Sustainable Grown products & consumables
- ☐ US certified organic farmers
- ☐ Coop America ☐ others (please list) [        ]

[ submit ]

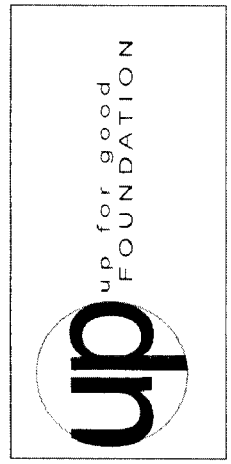

up for good
FOUNDATION

○Yes ○No  purchase organic, natural, sustainable & renewable products (at least 20% of our purchases fall under these categories).

○Yes ○No  purchase and/or use post-consumer recycled waste products, whenever possible.

○Yes ○No  use a programable thermostat & adjust the thermostat 2 degrees each season (68° maximum in the winter & 80° minimum in the summer).

○Yes ○No  use public transit, carpool, drive a hybrid and/or use non-motorized transportation.

○Yes ○No  set our computer monitor(s) to hibernate after 5 minutes and our hard drives to shut down after 30 minutes without use.

○Yes ○No  use alternate energy sources in the home such as, solar electricity, wind power and/or a geo-thermal temperature moderation system.

○Yes ○No  remove our names from junk mail lists, cancel all unnecessary catalogs, and continue to ensure our name stays off the junk mail lists.

○Yes ○No  have installed aerator faucets & maintain our plumbing fixtures to prevent leaks, drips & running water in toilets throughout the home ○Yes ○No  use recyclable water dispensers or filtered tap water versus individual bottled water.

○Yes ○No  buy locally and from businesses who are UP ON GREEN, whenever possible.

○Yes ○No  requested and received an energy audit within the past 12 months to help ensure maximum efficiency in energy usage throughout our home.

Fig. 4C

○Yes ○No  donate and/or volunteer for social and/or environmental betterment organizations ○donates ○volunteers ○donates & volunteers

OUR HOME USES & PROMOTES THE FOLLOWING CERTIFICATIONS

☐ Energy Star Products & Appliances ☐ Leadership in Energy and Environmental Design (LEED)
☐ Environmentally Preferable Products Database ☐ Scientific Certification Systems
☐ Forest Stewardship Council ☐ Certified Sustainable Grown products & consumables
☐ Greenguard ☐ US certified organic farmers
☐ Greenseal ☐ Coop America
☐ Greenmark ☐ others (please list)

submit

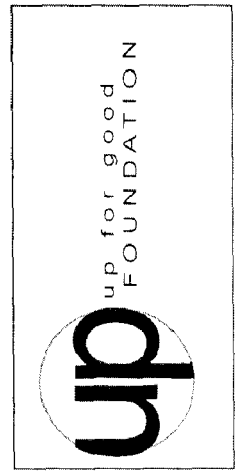

○ Yes ○ No   OUR COMPANY has installed low-flow and high-pressure plumbing fixtures and maintains the plumbing to prevent leaks, drips and water waste.

○ Yes ○ No   OUR COMPANY offers drinking water for employees and guests of our company that isn't packaged or shipped in plastic.

○ Yes ○ No   OUR COMPANY buys locally whenever possible (within a 100 mile radius).

○ Yes ○ No   OUR COMPANY offers and/or buys organic, natural, sustainable, and/or renewable products (>20%).

○ Yes ○ No   OUR COMPANY encourages its employees and its suppliers to become UP ON GREEN members.

○ Yes ○ No   OUR COMPANY has received an energy audit within the past 12 months to help ensure maximum efficiency in its energy usage. Please list the organization that performed the energy audit for your company and the month/year of the audit.

○ Yes ○ No   OUR COMPANY donates and/or volunteers for social and/or environmental betterment organizations.
Please list organizations that your company supports.

Please note whether your company donates and/or volunteers:
○ donates ○ volunteers ○ donates & volunteers

Fig. 5

- ○ Yes  ○ No   purchase organic, natural, sustainable & renewable products (at least 20% of our purchases fall under these categories).
- ○ Yes  ○ No   purchase and/or use post-consumer recycled waste products, whenever possible.
- ○ Yes  ○ No   use a programmable thermostat & adjust the thermostat 2 degrees each season (68° maximum in the winter & 80° minimum in the summer).
- ○ Yes  ○ No   use public transit, carpool, drive a hybrid and/or use non-motorized transportation.
- ○ Yes  ○ No   set our computer monitor(s) to hibernate after 5 minutes and our hard drives to shut down after 30 minutes without use.
- ○ Yes  ○ No   use alternate energy sources in the home such as, solar electricity, wind power and/or a geo-thermal temperature moderation system.
- ○ Yes  ○ No   remove our names from junk mail lists, cancel all unnecessary catalogs, and continue to ensure our name stays off the junk mail lists.
- ○ Yes  ○ No   have installed aerator faucets & maintain our plumbing fixtures to prevent leaks, drips, & running water in toilets throughout the home.
- ○ Yes  ○ No   use recyclable water dispensers or filtered tap water versus individual bottled water.
- ○ Yes  ○ No   buy locally and from businesses who are UP ON GREEN, whenever possible.
- ○ Yes  ○ No   requested and received an energy audit within the past 12 months to help ensure maximum efficiency in energy usage throughout our home.

Fig. 8

METHODS OF IDENTIFYING ENVIRONMENTALLY FRIENDLY BUSINESSES OR INDIVIDUALS

This application claims the benefit of U.S. Provisional Application Nos. 60/999,785, filed Oct. 19, 2007 and 61/007,655, filed Dec. 14, 2007, the entire content of each of which is incorporated herein by reference.

FIELD OF THE INVENTION

The present invention relates to environmentally friendly practices performed by businesses or individuals.

BACKGROUND OF THE INVENTION

In recent years, consumers have been becoming more and more conscious of the effect their decisions have on the environment. Many businesses have also adopted more conscientious and energy efficient practices. This has led to the emergence of an entirely new "green" industry with a new set of challenges and opportunities.

The most influential component to the success of the green movement is consumer behavior. Multiple studies indicate that globally more than 85% of adult consumers would like to make a conscious decision to purchase from companies that have a green reputation and operate with a focus on environmental responsibility. Up until now, the unmet challenge has been that consumers haven't had an easy way of determining what companies are doing environmentally. Studies show that although most consumers want to choose companies that are environmentally conscientious, most admit that they don't have the desire or the time to research each company with which they want to do business to determine what that company is doing environmentally.

SUMMARY OF THE INVENTION

This disclosure relates to techniques for identifying and/or certifying businesses and individuals can be certified as achieving recognizable "green" or "environmentally friendly" practices by a criteria application. The criteria application can include questions regarding the applicant's environmentally related practices and decisions. Those applicants that exceed a predetermined threshold of compliance can be certified. Any applicants that are performing environmental actions that exceed the criteria requirements can also communicate those additional initiatives with the tools identified in this disclosure so as to make the invention expandable for businesses and individuals that are at all levels of 'greening', although each needing to meet the minimum required criteria.

Qualified applicants can be provided with visual identifiers that notify the public that they are certified. The visual identifiers can provide the certified business' name and/or logo, can include a list of the specific environmentally conscious practices employed by that certified business or individual, and can include a logo or symbol of the certifying organization. The information provided by the visual identifiers located in highly visible locations at participating businesses allows consumers to easily and instantly see what businesses or organizations are doing environmentally, therefore empowering the consumers to make more informed decisions about the businesses they choose to support without requiring them to research the qualifications of a new seal, certificate, or brand.

In one example, a method includes an individual accessing a website through the use of a computing device, such as a personal computer. The website may instruct the user on how to complete a questionnaire that includes queries regarding the individual's environmentally friendly practices. The individual may answer the questions by selecting predetermined responses listed on the website. After completion, the website may tally the responses and determines whether the individual meets a predetermined level of environmentally friendly compliance. If so, then the individual is invited to complete more queries. In some instances, an eco-profile is generated using the responses to the questionnaire and additional queries. Through the use of the eco-profile, electronic messages are generated and the individual can process order requests for identification cards and electronic links. These cards and links enable the individual to publicly display compliance with the environmentally friendly criteria.

The details of one or more embodiments are set forth in the accompanying drawings and the description below. Other features, objects, and advantages will be apparent from the description and drawings, and from the claims.

BRIEF DESCRIPTION OF THE DRAWINGS

Figures 3, 3A, 3B, 3C, 3D:
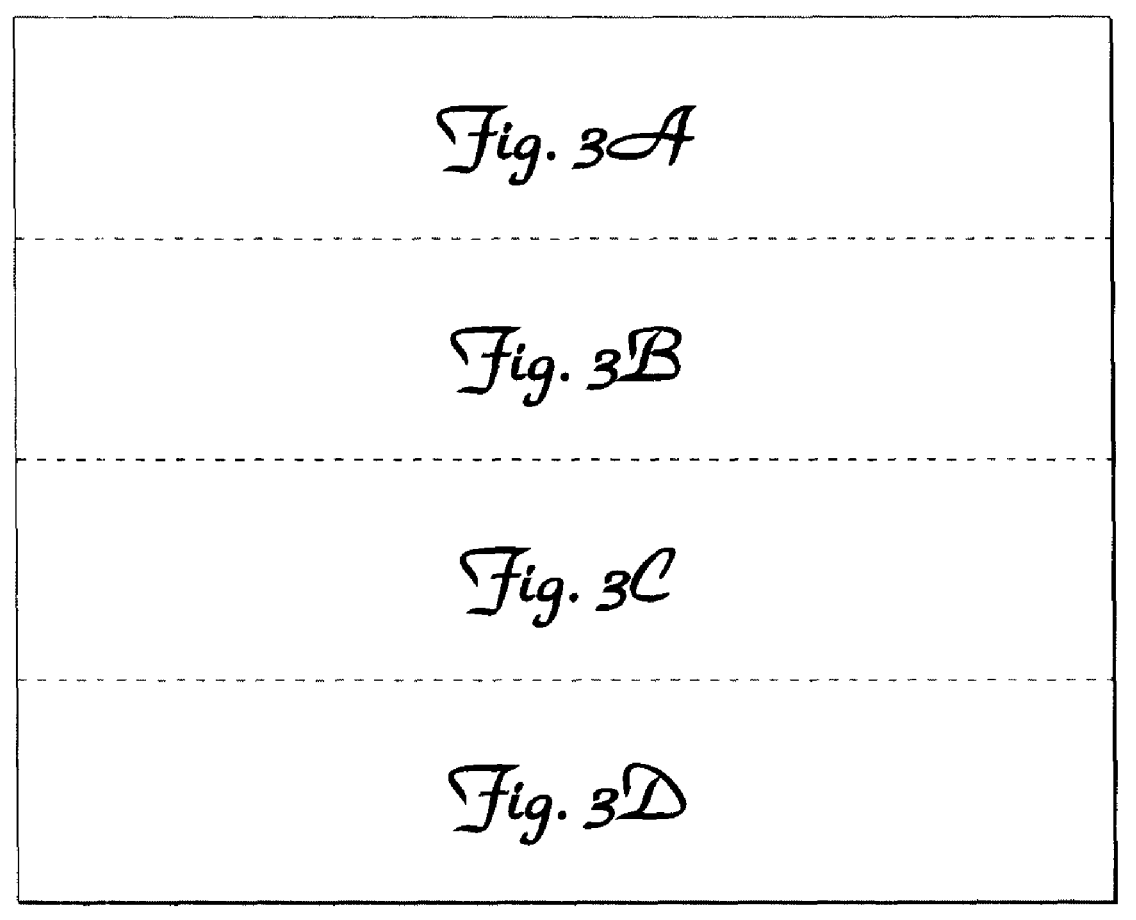

FIG. 3 is a screen diagram of a criteria application and eco-profile for a business according to an example embodiment.

FIG. 5 is a screen diagram of a criteria application and eco-profile for a business according to an example embodiment.

FIG. 8 is a screen diagram of a criteria application and eco-profile for an individual according to an example embodiment.

DETAILED DESCRIPTION OF THE INVENTION

To date there hasn't been an instant, comprehensive, consistent, organized, authenticated or universal way for consumers to easily identify, in the marketplace or online, which businesses are genuinely conducting their operations with eco-responsible initiatives and specifically identifying what their genuine initiatives are. Various embodiments of the present invention create a concise economic impetus for environmental progress by linking a business' environmental initiatives to reduced expenses and increased market share opportunities, and helps prevent the cancerous effects of misleading or ambiguous "green" claims which currently plague and impede the progress of the environmental movement.

Currently there are an increasing number of "green" certifications, brands, and seals appearing in the marketplace to promote companies or products, yet most consumers are confused by their meanings and report that seeing a "green" seal displayed tends to be ambiguous because the seal, certificate, or "green" brand doesn't identify the specific actions that business or product is achieving to earn that labeling. Studies and reports indicate that increasingly, "green" brands are being used to cause misleading perceptions in order to gain market share, which in turn is making consumers skeptical and harming the overall progress of the environmental movement.

Figure 1A:
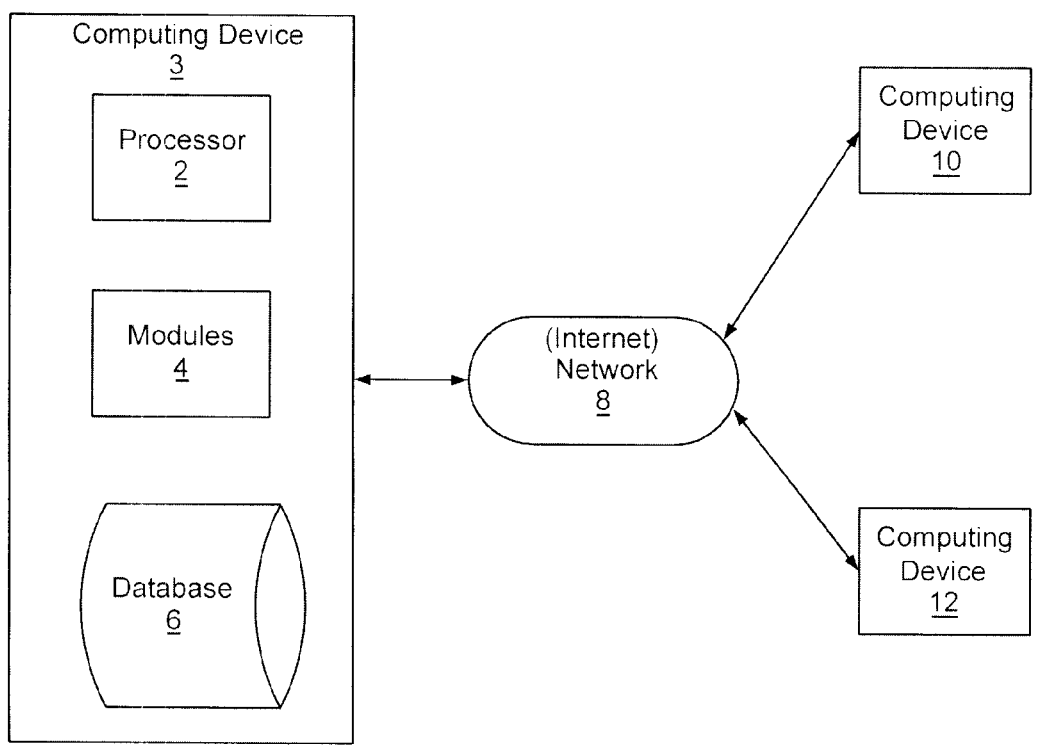
FIG. 1A is a block diagram displaying an example system that may be used to acquire information, execute one or more modules and store information in a database during the identification and/or certification of environmentally friendly businesses or individuals, according to an example embodiment.

FIG. 1A is a block diagram displaying an example system that may be used to acquire information, execute one or more modules and store information in a database during the identification and/or certification of environmentally friendly businesses or individuals, according to an example embodiment. A user may access a central computing device 3 through use of their computing device. FIG. 1A includes a central computing device which includes a processor 2, a set of computing modules 4, and a database 6. The typical user may access the central computing device (e.g., computing device 10 or 12). FIG. 1A includes a central computing device 3 which includes a processor 2, a set of computing modules 4, and a database 6. The typical user may access the central computing device 3 through the use of the user's computing device 10, 12 and a network 8 (such as, for example, the Internet). Any number of users may access the central computing device 3 despite the fact that FIG. 1A only shows two user computing devices 10, 12. The user starts the process by accessing the central computing device 3, which may then cause execution of one or more of the computing modules 4 through the use of the central computing device's processor 2. The processor 2 may access any and all of the modules 4 listed in FIG. 1B. This list of modules 4 is illustrative and should not be considered exhaustive. Information gathered through the use of the processor 2 and modules 4 may be stored in the central computing device 3, such as in the database 6 of central computing device 3. The modules 4 may each perform a different function in some instances, though, in certain cases, various functionalities described herein may be combined into one or more of the modules 4.

Figure 1B:
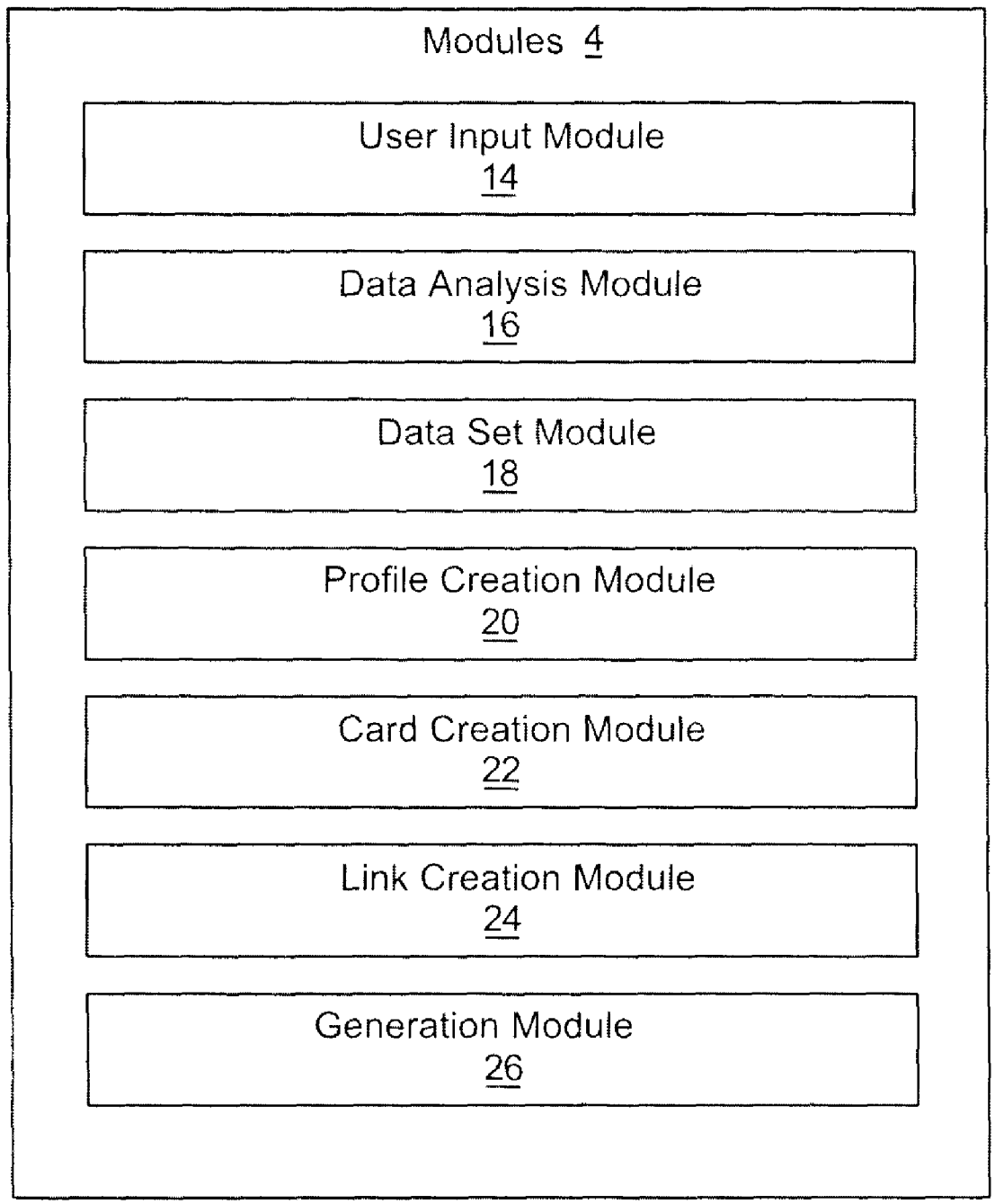
FIG. 1B is a block diagram displaying additional details of the modules shown in FIG. 1A, according to an example embodiment.

For instance, when a user accesses the central computing device 3, the processor 2 of the central computing device 3 may execute one or more of the modules 4 shown in FIG. 1B. The User Input Module 14 collects input from the user. The Data Analysis Module 16 applies various algorithms to the data collected by Module 14. The Data Set Module organizes the results from Modules 14 and 16 and arranges the data for storage and later retrieval. The Profile Creation Module 20 accesses the stored data in the database 6 and performs a predetermined function which displays the information and links additional information to the saved data. Physical embodiments of the Profile Creation Module 20 may be created through the use of the Card Creation Module 22. Electronic embodiments of the Profile Creation Module 20 may be created through the use of the Link creation Module 24 and the Message Generation Module 26. Further details regarding the use modules 4 are provided below.

Figure 2:
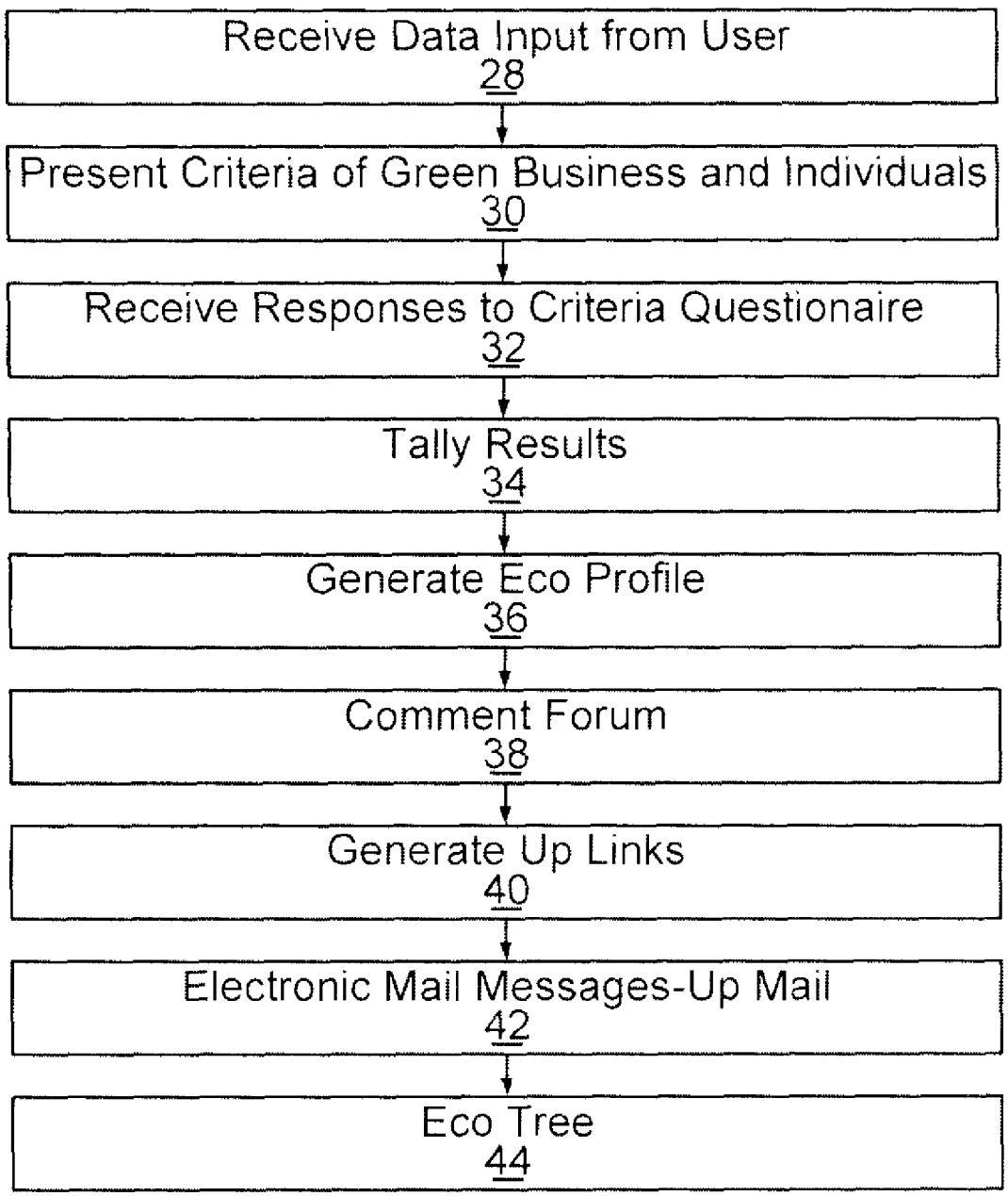
FIG. 2 is a flow chart displaying an example method for identifying and certifying a business or individual according to an example embodiment.
Figure 4A:
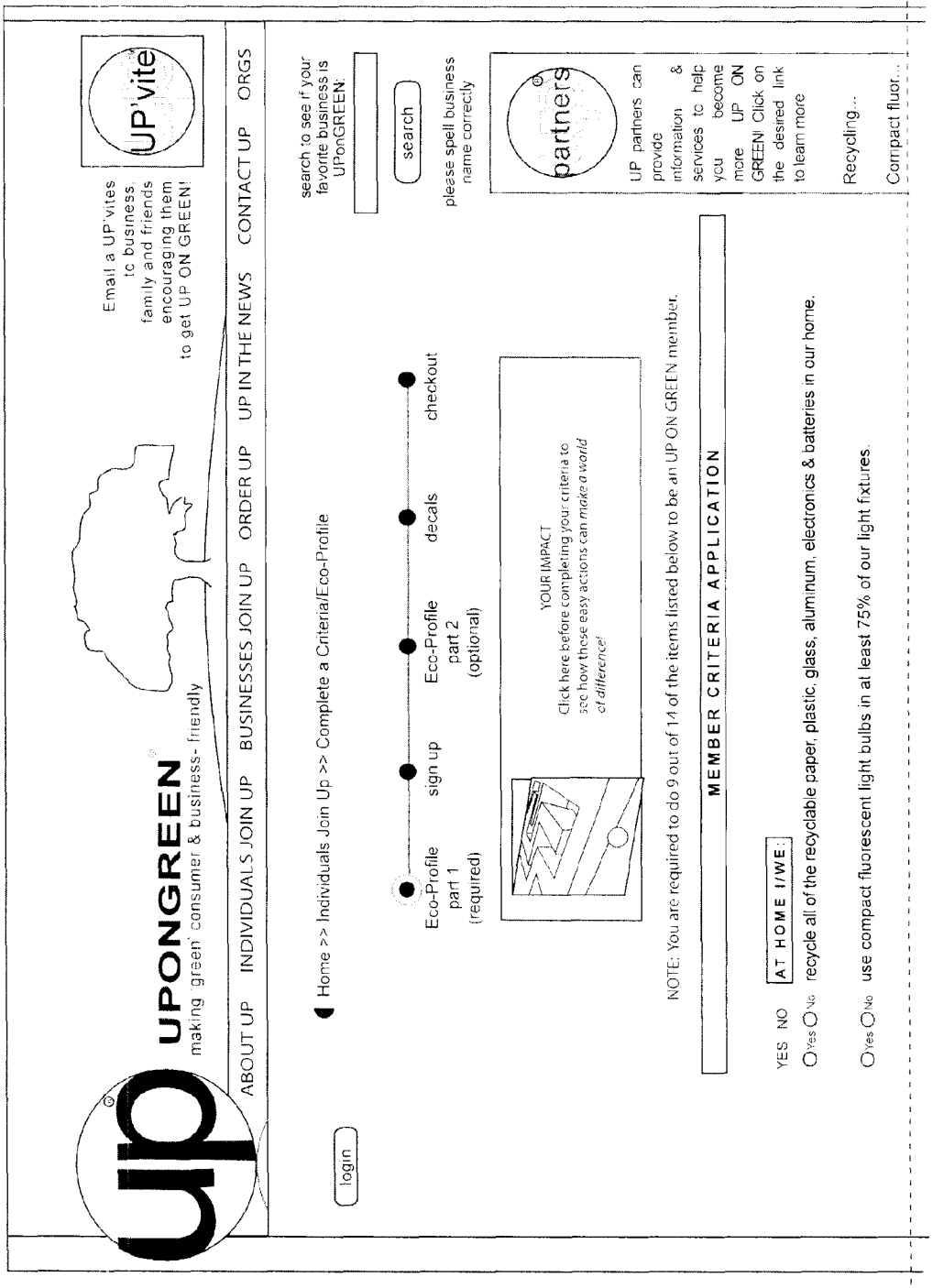
FIG. 4 is a screen diagram of a criteria application and eco-profile for a business according to an example embodiment.
Figure 6:
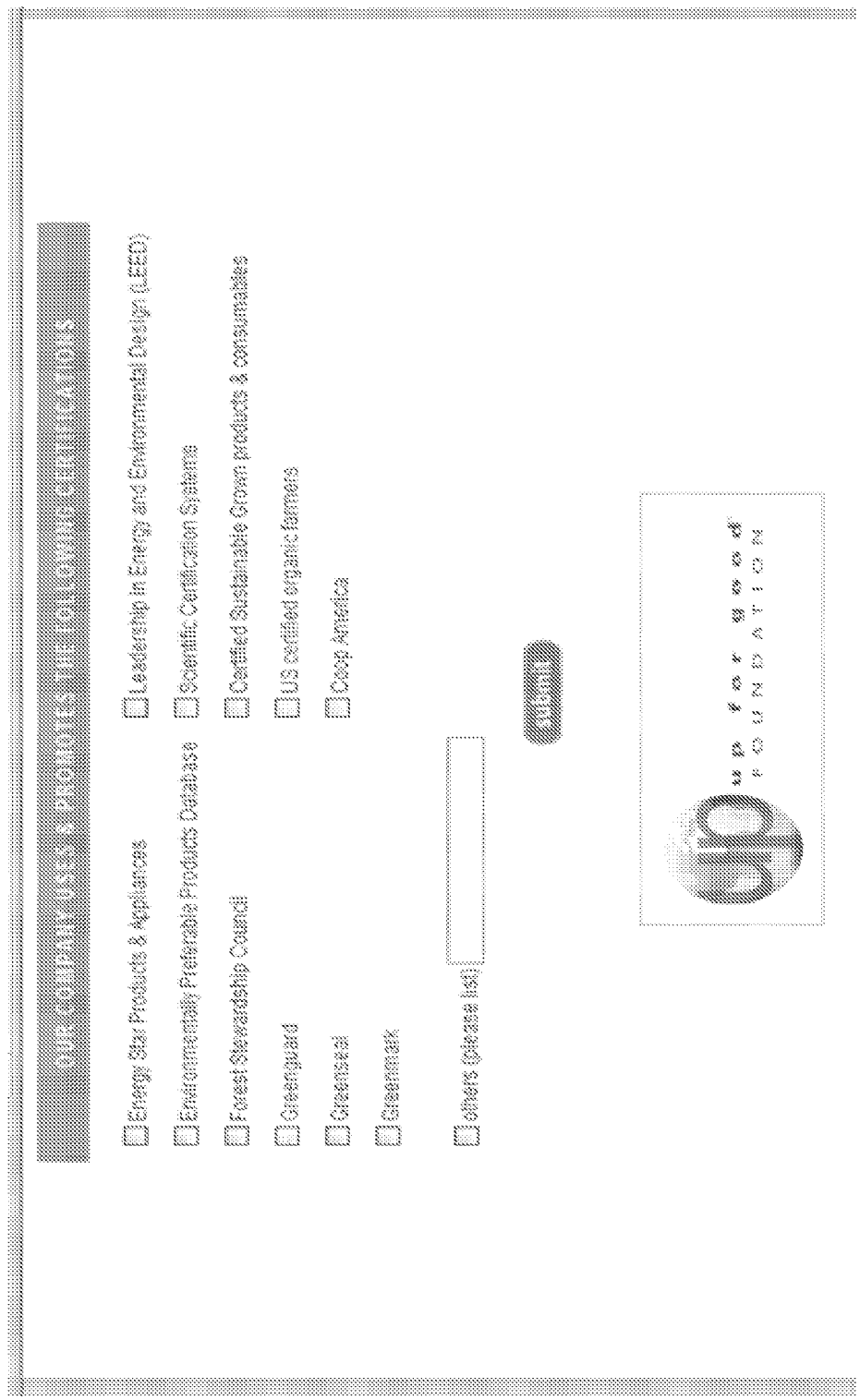
FIG. 6 is a screen diagram of a criteria application and eco-profile for a business according to an example embodiment.

FIG. 2 is a flow chart displaying an example method for identifying and certifying a business or individual according to an example embodiment. The actions shown in FIG. 2 may be performed by one or more of the modules shown in FIG. 1B. Action 28 receives the information supplied by the user. Action 30 displays information to the user. Action 32 receives responses to the information displayed by Action 30. Action 34 tallies the responses and determines whether the user meets preset criteria for compliance. If so, then Action 36 generates an eco-profile and stores the information in the main computing database. Once a user generates an eco-profile, then Action 38 collects information from other users regarding the authenticity of the eco-profile owner's claimed compliance. Action 40 generates electronic links for the eco-profile owner's use in web applications and other electronic medium. These links allow connection to the main computing device through the use of the internet and an external computing device. Action 42 generates electronic messages through the use of the main computing device and the internet. Action 44 generates an electronic representation of the interconnectivity of the various users based on responses to the questionnaire generated by Actions 30 and 32.

To certify businesses as meeting certain environmental criteria, first a criteria application and eco-profile is compiled. The criteria application includes questions regarding a business's environmentally related practices and decisions. A sample criteria application is depicted in FIGS. 3-6. The criteria application can ask a wide range of questions regarding topics such as a business's recycling practices, use of public transportation, and energy saving practices. A criteria application can be made available online for any businesses desiring to be certified to fill out. Criteria applications can alternatively be mailed, or otherwise distributed in hard copy, to businesses.

Businesses fill out the criteria application, indicating how many of the eco-friendly requirements they meet. Businesses that meet or exceed a certain threshold level, such as for example, 70% of the requirements, are approved for certification as a "qualifying business." Because only a certain percentage of requirements need to be met, businesses need not have all of the same environmentally conscious practices to qualify. If a business fails to meet the threshold, it can be informed of how many more requirements it must meet to qualify for certification. The business can also be provided with suggestions for ways in which it can adjust its practices to exceed the threshold. The business can then adjust its practices and reapply for certification. In addition to filling out the criteria application, the business can also list other environmental or humanitarian organizations they are associated with or additional certifications they have earned which can also be displayed on their profile publicly with links into each organization's respective website.

The detailed criteria information of the certified business and any additional environmental initiatives which exceed the criteria, can be made accessible to the public through an online consumer-friendly database as well as.

Businesses that are certified may be required to reapply periodically, such as, for example, each year, to remain certified. As basic environmental standards become more mainstream and new eco-friendly solutions and technologies evolve, the criteria requirements can be modified. The information provided by each business can be collected and organized to provide valuable statistics identifying the trends of environmental behavior of individuals and businesses, which is able to be sorted by criteria choices, additional environmental actions, geographic areas, industries and size of business.

Figure 7:
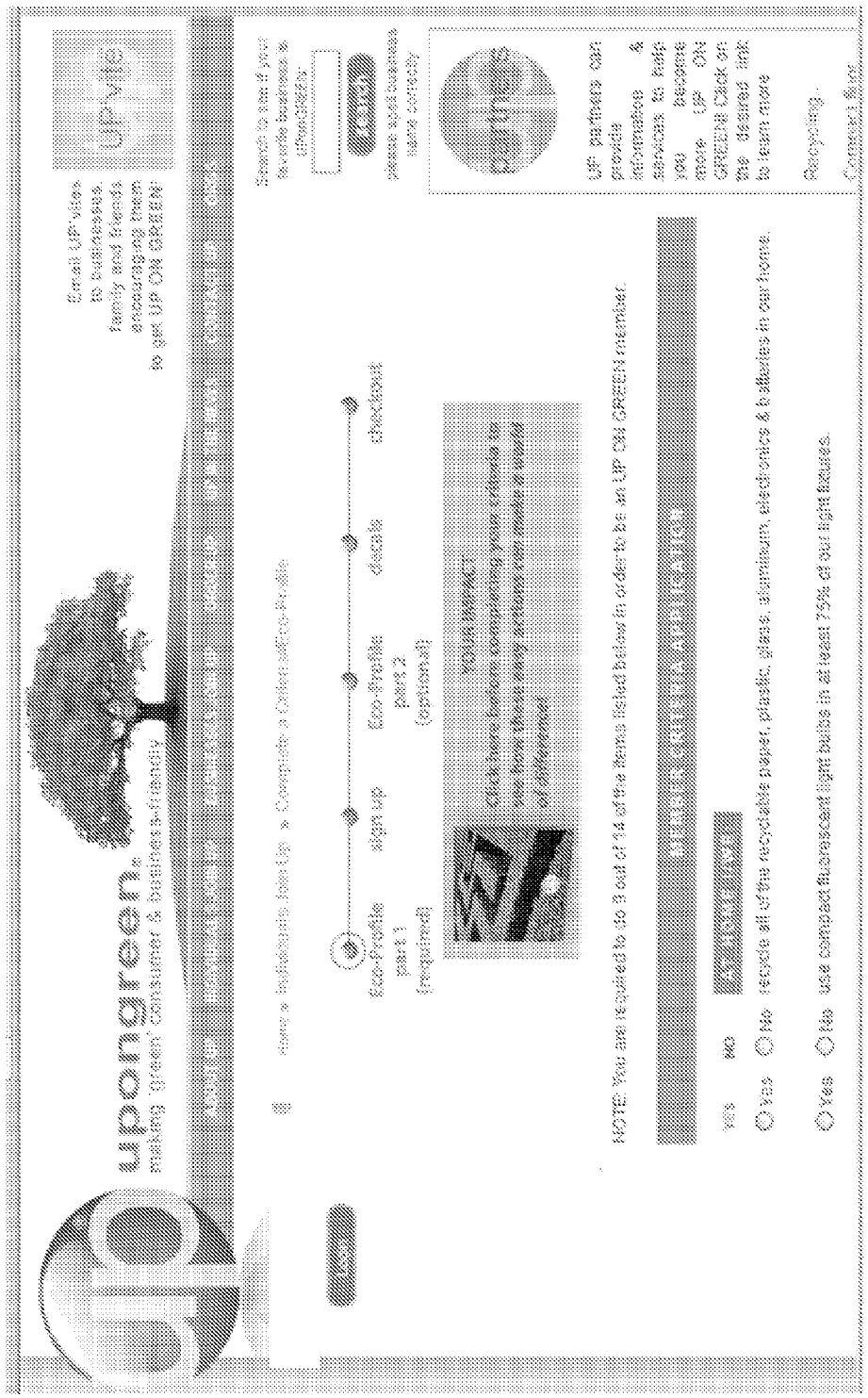
FIG. 7 is a screen diagram of a criteria application and eco-profile for an individual according to an example embodiment.
Figure 9:
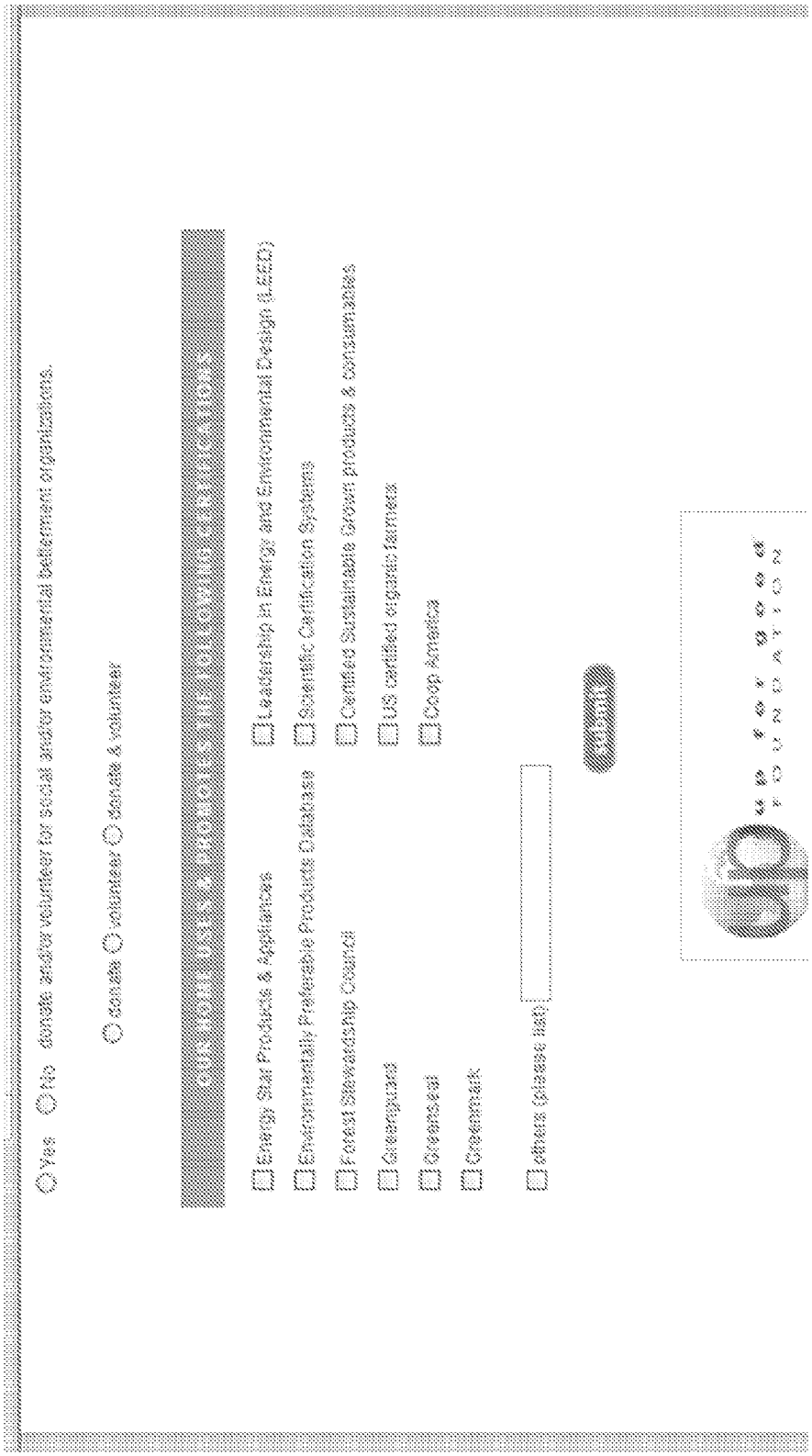
FIG. 9 is a screen diagram of a criteria application and eco-profile for an individual according to an example embodiment.

Individual consumers can also apply for certification. An example of a criteria application for an individual is depicted in FIGS. 7-9. The application can ask various questions about the individual's environmental practices, such as whether the individual recycles or uses energy saving practices at home and whether the individual uses public or other eco-friendly transportation. The website can also create a non-public database of individuals who are certified to measure the change in population of individuals and the population of businesses who are choosing to implement environmental practices. This can provide certified organizations with a list of customers to whom they can advertise their environmentally friendly practices and products and can provide an easy way for certified individuals who wish to be a part of a public database to locate other certified individuals with whom to communicate.

For certified businesses and individuals, electronic tools are available which link their business's website or email signature lines or individual's online network tools (such as Facebook, YouTube or LinkedIn profiles), directly into the certified business's or certified individual's criteria or eco-profile on the central certification database.

Certified businesses or individuals can engage or inspire other businesses or individuals to become certified as well, and when they do so, the original certified entity can be publicly credited for inspiring others to participate. The online database in this invention tracks where each new applicant learned of the certification program. Each certified business or individual can elect to have a tally appear on their online public profile which displays in real-time how many businesses and/or individual members they have inspired directly or indirectly, to become certified. This public recognition can create an impetus for businesses and individuals to affect change beyond their own practices and be publicly recognized and rewarded for it.

Qualifying businesses and individuals can be provided with a public, visual identifier to indicate to consumers and other businesses that they have been certified as meeting the green standards of the criteria. The visual identifier can include the business's logo or name and list specifically what it is doing that focuses on eco-friendliness, either listing its adopted criteria actions and/or actions that exceed the criteria. This is advantageous from the consumer's perspective since the certification process does not require the businesses to all meet the exact same requirements, therefore each identifier displays the list of actions that are unique to that particular business. A visual identifier listing specifically what a business does that qualifies it for certification allows a consumer to identify businesses that comply with the environmental practices that are most important to the consumer. Alternatively, the visual identifier can be a logo or symbol of the certifying organization. All qualifying businesses can be provided with visual identifiers. Alternatively, only those businesses that meet or exceed the threshold level for certification can be provided with visual identifiers, use of the certification logo or symbol, and a presence in the certification database (described below). Visual identifiers can include stickers, labels, signs, and posters. Visual identifiers can be displayed at a business's location anywhere that it will be visible to customers, employees, vendors, suppliers, etc. These areas can include on the business's doors, windows, near cash registers, waiting areas, break rooms, and delivery areas. Visual identifiers can also be displayed on a business's website, product packaging (such as printed on cereal boxes under the nutritional label), vehicle decals, in advertising and marketing materials, etc.

A database can be compiled of the information and made available in a public directory searchable by business, organization, location, product or service in any possible category. The directory can be made available on a website. The directory allows consumers, employees, and the general public to locate businesses, services, and products that all meet and/or exceed specific criteria requirements in the certification process. Because of the application process, individuals will know that the businesses in the directory meet a threshold of environmental responsibility. Each business's criteria application can be made available on the website.

The website can also allow individuals to comment about participating businesses' practices, whether positive or negative, by posting a comment on the website for public viewing. If a business is found to have misrepresented its practices on the criteria application in order to become certified, the business will no longer be authorized to use the visual identifiers and its presence on the online database will be suspended until it corrects the problem and reaches the minimum requirements of the criteria. If certification or membership of such a business is terminated due to non-compliance, the company can reapply for certification if it upgrades the eco-friendliness of its business practices.

Labeling, certifying, and/or identifying businesses and individuals based on their environmental practices as described is advantageous for consumers, employees, the general public, and the environment. The resulting benefit for businesses who choose to meet the criteria is that they will be more likely to attract the 85% of consumers who wish to buy from or support businesses who meet such standards over businesses who don't. Therefore, the present invention can be considered an economic driver as well as an environmental driver. Consumers, employees, and the general public can make more informed decisions to support the environment with the information provided by the identifiers and directory. The environment will therefore benefit because the 85% or more consumers who want to make more environmentally conscientious choices will now have a way to quickly identify which companies are more eco-friendly and genuine in their claims. Additionally, businesses will: have a greater motivation to meet or exceed the environmental standard set forth in the criteria, be inspired to participate in this consumer awareness resource to gain market share, resist making misleading claims, and will even be inspired to engage others to participate, which can create exponential progress. The final result is increased demand for environmental technologies and solutions which can help drive the economy, and a sustainable and increasingly positive overall impact on the environment from society.

Various embodiments may provide unique methods and/or solutions that are inspired by the emergence of a new industry. Certain unique features stem from a new technology emerging at a time when the Internet is a standard tool in people's lives. This new industry has created a need for criteria requirements which standardize a minimum set of "greening" actions, a need for a public identifier, combined with an online database that functions as a communication and search resource for all consumers including business-to-business customers. Various embodiments of the invention may incorporate unique features that motivate businesses to implement actions that positively impact the environment and motivates them to engage other businesses and individuals to do the same.

In one or more example embodiments, the functions described above may be implemented in hardware, software, firmware, or any combination thereof. If implemented in software, the functions may be stored on or transmitted over as one or more instructions or code on a computer-readable medium that may be executed by one or more processors, such as the processor 2 shown in FIG. 1A. Computer-readable media includes both computer storage media and communication media including any medium that facilitates transfer of a computer program from one place to another. A storage media may be any available media that can be accessed by a computer. By way of example, and not limitation, such computer-readable media can comprise random-access memory (RAM), read-only memory (ROM), Electrically Erasable Programmable ROM (EEPROM), Compact Disc ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk. Combinations of the above should also be included within the scope of computer-readable media.

Various embodiments of the invention have been described. These and other embodiments are within the scope of the following claims.

What is claimed is:

1. A method of providing environmental transparency for entities, allowing consumers or other relationship partners to have access to input regarding the entities' performance of environmental actions and providing transparency, the method comprising:
   providing a computer interface to collect such input from a first entity;
   receiving the input from the first entity via the computer interface;
   storing the input from the first entity on a computer readable storage medium;
   publicly displaying the input from the first entity on a website; and
   publicly displaying a visual entity identifier adjacent to the input from the first entity on the website, wherein the visual entity identifier is one of a logo or a name,
wherein the plurality of environmental actions directly employed by the first entity consists of:
   promoting an environmentally friendly product;
   employing a recycling practice; and
   employing an energy saving practice.

2. A method of providing transparency for entities, allowing consumers or other relationship partners to have access to input regarding the entities' performance of environmental actions and providing transparency, the method comprising:
   providing a computer interface to collect such input from the first entity, the interface comprising a website including user instructions on how to complete a questionnaire that includes queries regarding the entities' environmental actions;
   receiving the input from the first entity via the computer interface when the first entity responds to the queries on the website;
   storing the input from the first entity on a main computing database;
   publicly displaying the input from the first entity on a website;
   publicly displaying a visual entity identifier adjacent to the input from the first entity on the website, wherein the visual entity identifier is one of a logo or a name;
   receiving inspiration information from other entities identifying the first entity as having inspired the respective other entities;
   accumulating a total number of the respective other entities that are inspired by the first entity to create a tally; and
   publicly displaying the tally with the input and the visual entity identifier of the first entity,
wherein, the plurality of environmental actions directly employed by the first entity consists of:
   purchasing environmentally friendly products;
   reducing the environmental impact of transportation;
   setting personal computers to power down automatically;
   avoiding purchases of bottled water; and
   turning off lights when leaving a room.

3. A method of providing environmental transparency for entities, allowing consumers or other relationship partners to have access to input regarding the entities' performance of selected environmental actions and providing transparency, the method comprising:
   providing a computer interface to collect a set of the input from a first entity;
   receiving the set of input from the first entity via the computer interface;
   storing the set of input from the first entity on a computer readable storage medium;
   publicly displaying the set of input from the first entity and the associated selected environmental actions on a website; and
   publicly displaying a visual entity identifier adjacent to the set of input from the first entity on the website, wherein the visual entity identifier is one of a logo or a name,
wherein the selected environmental actions consist of:
   employing one or more recycling practices;
   employing one or more eco-friendly transportation practices;
   using eco-friendly materials and products;
   employing waste-reduction practices;
   employing one or more water conservation practices;
   obtaining environmental certifications and ratings;
   promoting progress in the community by inspiring others;
   supporting social and environmental betterment organizations;
   and
   employing one or more energy saving practices.

4. The method of claim 3, further comprising printing the input regarding the first entity's performance of the environmental actions and the visual entity identifier on a display medium and displaying the display medium.

5. The method of claim 3, further comprising receiving input regarding performance of the environmental actions by a second entity via the computer interface from the second entity of the entities.

6. The method of claim 5, further comprising receiving inspiration information associated with the first entity via the interface from the second entity identifying the first entity as an inspiring entity.

7. The method of claim 6, further comprising publicly displaying the inspiration information associated with the first entity by providing a tally of a number of entities that the first entity has inspired.

8. The method of claim 7, wherein publicly displaying the inspiration information associated with the first entity includes creating a graphical representation of the inspiration information.

9. The method of claim 6, further comprising receiving input regarding performance of the environmental actions via the computer interface from a third entity of the entities.

10. The method of claim 9, further comprising receiving inspiration information associated with the second entity via the interface from the third entity identifying the second entity as an inspiring entity.

11. The method of claim 10, further comprising publicly displaying the inspiration information the profiles-associated with each of the second entity and the first entity.

12. The method of claim 11, wherein publicly displaying inspirational information associated with each of the second and the first entity includes creating a graphical representation of the inspiration information.

13. The method of claim 3, further comprising creating a non-public database of a plurality of entities directly employing environmental actions, wherein the non-public database allows a certified entity to measure the change in population of entities that are choosing to employ environmental actions.

14. The method of claim 3, further comprising receiving and publicly displaying a comment regarding the first entity, wherein the comment comprises one of positive and negative information regarding the first entity.

15. The method of claim 14, wherein the negative information regarding the first entity reveals that the first entity has misrepresented the environmental actions that the first entity claims to have directly employed, resulting in one of a termination or suspension of a publicly displaying right of the first entity.

16. The method of claim 3, wherein the entities comprise businesses and individuals.

17. The method of claim 3, further comprising providing suggestions for ways entities can adjust their practices.

18. The method of claim 3, further comprising providing motivation for entities to implement actions that positively impact the environment.

19. The method of claim 3, further comprising receiving evidence of an environmental certification and an associated logo from the first entity and publicly displaying the associated logo on the website adjacent the visual identifier.

20. The method of claim 3, wherein the input regarding the first entity's performance of the environmental actions is one of the group consisting of yes or no.

* * * * *